United States Patent
Yan

(10) Patent No.: US 12,548,192 B2
(45) Date of Patent: Feb. 10, 2026

(54) CROSS-SENSOR VEHICLE SENSOR CALIBRATION BASED ON OBJECT DETECTIONS

(71) Applicant: Atieva, Inc., Newark, CA (US)

(72) Inventor: Bei Yan, Fremont, CA (US)

(73) Assignee: Atieva, Inc., Newark, CA (US)

( * ) Notice: Subject to any disclaimer, the term of this patent is extended or adjusted under 35 U.S.C. 154(b) by 348 days.

(21) Appl. No.: 18/344,369

(22) Filed: Jun. 29, 2023

(65) Prior Publication Data

US 2024/0037790 A1     Feb. 1, 2024

Related U.S. Application Data

(60) Provisional application No. 63/369,688, filed on Jul. 28, 2022.

(51) Int. Cl.
| | |
|---|---|
| G06T 7/80 | (2017.01) |
| G01S 7/40 | (2006.01) |
| G01S 7/52 | (2006.01) |
| G01S 13/86 | (2006.01) |
| G01S 17/86 | (2020.01) |
| G06T 7/70 | (2017.01) |

(52) U.S. Cl.
CPC .............. *G06T 7/80* (2017.01); *G01S 7/40* (2013.01); *G01S 7/52004* (2013.01); *G01S 13/86* (2013.01); *G01S 17/86* (2020.01); *G06T 7/70* (2017.01)

(58) Field of Classification Search
CPC ..... G06T 7/80; G06T 7/70; G01S 7/40; G01S 7/52004; G01S 13/86; G01S 17/86; G01S 7/403; G01S 13/865; G01S 13/867; G01S 7/4021
See application file for complete search history.

(56) References Cited

U.S. PATENT DOCUMENTS

| | | | |
|---|---|---|---|
| 2010/0235129 A1* | 9/2010 | Sharma | G01S 17/86 702/97 |
| 2010/0253492 A1* | 10/2010 | Seder | G01S 13/931 348/148 |
| 2012/0290169 A1* | 11/2012 | Zeng | G01S 7/4972 701/30.2 |
| 2015/0070207 A1* | 3/2015 | Millar | G01S 13/4454 342/174 |
| 2017/0169627 A1 | 6/2017 | Kim et al. | |
| 2017/0307730 A1 | 10/2017 | Baba | |

(Continued)

OTHER PUBLICATIONS

International Search Report and Written Opinion for PCT Application No. PCT/US2023/069382, mailed on Sep. 22, 2023, 14 pages.

*Primary Examiner* — Molly Wilburn
(74) *Attorney, Agent, or Firm* — Brake Hughes Bellermann LLP

(57) ABSTRACT

A method comprises: receiving first output values from a first sensor of a vehicle, the first output values reflecting a position of an object external to the vehicle; receiving second output values from a second sensor of the vehicle, the second output values reflecting the position of the object; determining a measurement difference regarding the position of the object based on the first and second output values; and performing an action regarding at least one of the first or second sensors based on determining the measurement difference.

18 Claims, 6 Drawing Sheets

(56) References Cited

U.S. PATENT DOCUMENTS

| | | |
|---|---|---|
| 2020/0088841 A1* | 3/2020 | Yu .............................. G01S 7/40 |
| 2021/0215505 A1 | 7/2021 | Castorena Martinez et al. |
| 2022/0119004 A1 | 4/2022 | Avadhanam et al. |
| 2022/0315037 A1 | 10/2022 | Wankhede et al. |
| 2022/0365193 A1* | 11/2022 | Wetoschkin .......... G01S 7/4026 |
| 2023/0044279 A1 | 2/2023 | Lu |

\* cited by examiner

CROSS-SENSOR VEHICLE SENSOR CALIBRATION BASED ON OBJECT DETECTIONS

CROSS-REFERENCE TO RELATED APPLICATION

This application claims benefit, under 35 U.S.C. § 119, of U.S. Provisional Patent Application No. 63/369,688, filed on Jul. 28, 2022, entitled "CROSS-SENSOR VEHICLE SENSOR CALIBRATION BASED ON OBJECT DETECTIONS", the disclosure of which is incorporated by reference herein in its entirety.

TECHNICAL FIELD

This document relates to cross-sensor vehicle sensor calibration that is based on object detections.

BACKGROUND

Some vehicles manufactured nowadays are equipped with one or more types of systems that can at least in part handle operations relating to the driving of the vehicle. Some such assistance involves automatically surveying surroundings of the vehicle and being able to take action regarding detected vehicles, pedestrians, or objects. Such automatic surveillance involves the use of sensors and the performance thereof depends on the accuracy of such sensors. In the past, vehicle calibrations have included so-called end of line (EOL) calibration or traditional online calibration. For example, EOL calibration is performed in the factory using precisely marked equipment to establish a ground truth for the sensor output. As another example, traditional online calibration is performed by the vehicle itself and has sought to calibrate each sensor independently based on that sensor's output.

SUMMARY

In an aspect, a method comprises: receiving first output values from a first sensor of a vehicle, the first output values reflecting a position of an object external to the vehicle; receiving second output values from a second sensor of the vehicle, the second output values reflecting the position of the object; determining a measurement difference regarding the position of the object based on the first and second output values; and performing an action regarding at least one of the first or second sensors based on determining the measurement difference.

Implementations can include any or all of the following features. The first and second outputs comprise azimuth values regarding the object relative to the vehicle, and wherein the measurement difference comprises an azimuth difference regarding the first and second sensors. At least one of the first and second sensors is a camera, a light ranging and detection device, or a radar. A measurement difference value is determined for each pair of a first output value and a second output value so that multiple measurement difference values are determined. Determining the measurement difference comprises determining a median or average of the multiple measurement difference values. The method further comprises determining a convergence of the measurement difference values, wherein the action is performed in response to determining the convergence of the measurement difference values. Determining the convergence of the measurement difference values comprises determining a standard deviation of the measurement difference values, wherein the convergence of the measurement difference values is determined in response to the standard deviation meeting a threshold value. Determining the measurement difference comprises performing a recursive process where a previously calculated statistic, and a current measurement difference value, are stored in memory, and wherein the previously calculated statistic is updated based on the current measurement difference value in each iteration of the recursive process. At least one calibration procedure was previously performed for each of the first and second sensors of the vehicle, and wherein the measurement difference is determined to find a calibration inaccuracy of the calibration procedure. For one of the first and second sensors of the vehicle a calibration procedure was not previously performed, and wherein the measurement difference is determined to obtain a calibration parameter for the one of the first and second sensors. Performing the action comprises applying the obtained calibration parameter to the one of the first and second sensors. A calibration status for at least one of the first and second sensors of the vehicle is unknown, and wherein the measurement difference is determined to decide whether to (i) perform an online calibration of the vehicle or (ii) bring the vehicle in for service. The action comprises comparing the measurement difference with a threshold. The method further comprises, in response to the measurement difference exceeding the threshold, performing a calibration of at least one of the first or second sensors. The method further comprises, in response to the measurement difference not exceeding the threshold, compensating for the measurement difference in a control algorithm for the vehicle.

BRIEF DESCRIPTION OF DRAWINGS

Like reference symbols in the various drawings indicate like elements.

DETAILED DESCRIPTION

Figure 1:
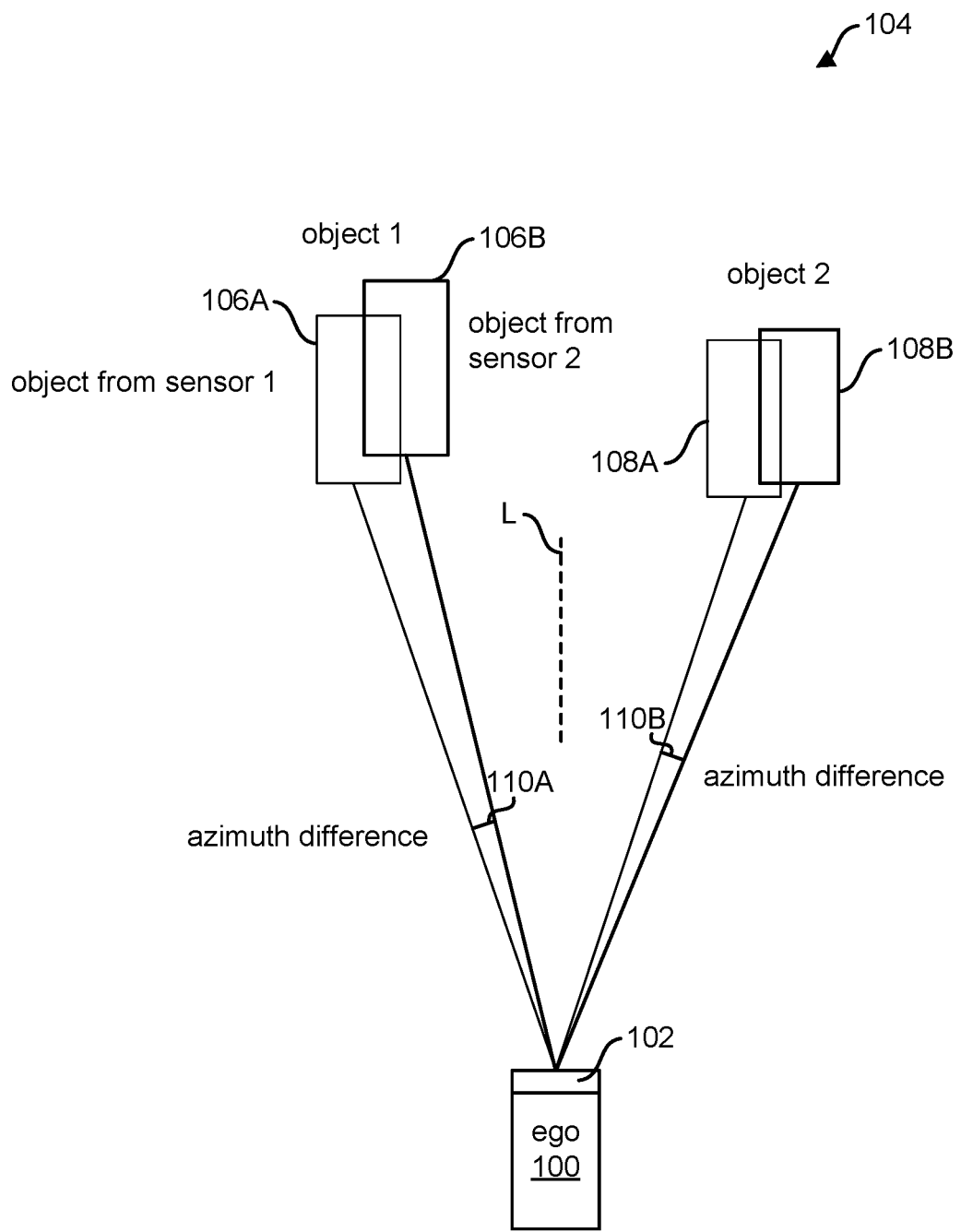
FIG. 1 schematically shows an example of a vehicle with sensors generating outputs reflecting a position of an object.

This document describes examples of systems and techniques that can perform cross-sensor vehicle sensor calibration based on object detections. The calibration is performed across two or more sensors, rather than independently for each sensor. The present subject matter can provide an alternative approach to performing online calibration, whether in combination with traditional online calibration or not. Approaches according to the present subject matter can be performed to determine whether calibration of the vehicle should be performed, and if so which type of calibration. As another example, cross-sensor vehicle sensor calibration can be performed to determine a calibration parameter for a sensor. As such, the present subject matter can add an additional layer to traditional vehicle sensor calibration by cross-checking objects using more than one sensor. When automatic calibration for a sensor is not available, the present subject matter can be applied to calibrate the sensor by cross-checking one or more other sensors.

In prior approaches, EOL calibration is performed using complex stations that are precisely marked with sensor-detectable indicia. Because of the inherent variability in manufacturing processes or device characteristics, the orientation of any individual sensor can vary between respective vehicles. The vehicle being manufactured is therefore carefully positioned relative to the EOL station and sensor outputs are read to establish a ground truth regarding calibration. Another prior approach involves calibration performed by a system local to the vehicle, which is sometimes referred to as online calibration. In traditional online calibration, the vehicle system calibrates one or more of the vehicle's sensors after the vehicle leaves the factory. This has been applied with some ADAS features, which may initially not have been activated in the vehicle until sometime after customer delivery, pending completion of the traditional online calibration. However, traditional online calibration has been performed independently for each sensor using only sensor stand-alone information, without the benefit of cross-vehicle measurements. Moreover, traditional online calibration can have some limitations, such as sensors that may have different calibration accuracy, a sensor not detecting lane markers on a heavily trafficked road, or unfavorable weather conditions or vehicle surroundings. These or other circumstances can delay completion of the traditional online calibration.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples described herein refer to an advanced driver-assistance system (ADAS). In some implementations, an ADAS can perform assisted driving and/or autonomous driving. An ADAS can at least partially automate one or more dynamic driving tasks. An ADAS can operate based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of an ADAS, not every ADAS is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples described herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 schematically shows an example of a vehicle 100 with sensors 102 generating outputs reflecting a position of an object. The vehicle 100 and/or the sensors 102 can be used with one or more other examples described elsewhere herein. The vehicle 100 is here schematically shown as a box, and the vehicle 100 is shown from above while located on a surface 104. The vehicle 100 may be stationary or in motion on the surface 104 in the present example. For example, the surface 104 can be a roadway, a floor surface, or any other terrain that supports the vehicle 100.

The sensors 102 can include two or more sensors. The sensors 102 can be of the same type as each other, or can be of two or more different types. Each of the sensors 102 can be mounted or installed at any position relative to the body of the vehicle 100. For example, the sensor(s) 102 can be installed on an outside of, or inside, the vehicle 100. Any of multiple types of sensors can be used for the sensor(s) 102. In some implementations, at least one of the sensors 102 includes a camera. In some implementations, at least one of the sensors 102 includes a light ranging and detection (LiDAR) device. In some implementations, at least one of the sensors 102 includes a radar. Other sensors can be used in addition or alternatively.

The sensors 102 can detect one or more objects in relation to the vehicle 100 and can generate at least one output value accordingly. Here, one of the sensors 102 generates an output 106A corresponding to detection of an object external to the vehicle 100. Similarly, another one of the sensors 102 generates an output 106B corresponding to detection of the same object. While the outputs 106A-106B reflect substantially the same size of the detected object, the outputs 106A-106B are not identical to each other because the sensors 102 in this example give somewhat different information from each other as to the location of the object.

Corresponding detections can be made regarding another object in relation to the vehicle 100. Here, one of the sensors 102 generates an output 108A corresponding to detection of another object external to the vehicle 100, and yet another one of the sensors 102 generates an output 106B corresponding to detection of that same object. As such, the outputs 106A-106B correspond to respective sensors' detection of one object, and the outputs 108A-108B correspond to the respective sensors' detection of another object.

Each of the outputs 106A-106B and 108A-108B can relate to one or more aspects of the object's relation to the position of the vehicle 100. In some implementations, the output can reflect a measurement relative to a reference. For example, the sensor 102 can determine an azimuth (e.g., horizontal angle) between the object and an imaginary longitudinal axis L of the vehicle 100. As another example, the sensor 102 can determine an elevation (e.g., vertical angle) between the object and the imaginary longitudinal axis L of the vehicle 100. Other measurements can be used, including, but not limited to, a roll value or a pitch value. The choice of the type(s) of measurement to be used can take into account the characteristics of the sensors 102. For example, a radar may not deliver elevation information, so horizontal object detection (i.e., azimuth) may be chosen. On the other hand, a LiDAR device may have elevation information but another sensor may limit the available choices. As another example, an image reader installed in the vehicle 100 may provide an increased ability for object detection.

A measurement difference can be determined between at least two of the outputs 106A-106B and 108A-108B. The measurement difference reflects a difference between the positions of the same object as detected by two or more of the sensors 102. In some implementations, the measurement is of an azimuth and the measurement difference regarding the position of the object is then an azimuth difference. For example, an azimuth difference 110A is here illustrated regarding the outputs 106A-106B. Similarly, an azimuth difference 110B is here illustrated regarding the outputs 108A-108B.

At least one of the obtained measurement differences can be compared with a threshold. If the measurement difference exceeds the threshold, an action can be taken (or the action can be inhibited). In some implementations, the threshold can indicate a need to perform calibration for the vehicle 100. If the threshold is met, this can indicate that the calibration of at least one of the sensors 102 is off. As such, the performed action can be to trigger one or more types of calibration. For example, online calibration can be performed, or the operator of the vehicle 100 can be prompted to bring the vehicle 100 to a service station for calibration.

Similarly, if the measurement difference does not exceed the threshold, another action can be taken (or the action can be inhibited). In some implementations, a compensation for a relatively minor measurement difference can be performed. For example, the perception component of an ADAS may have been designed to tolerate minute aberrations in the outputs of various sensors. One or more parameters of the ADAS can be adjusted, based on the measurement difference, to compensate for the difference in location of the same object according to the sensors 102. As another example, the system can take into account which of the sensors currently has the better calibration. This follows from the type of sensor that is being used an its intrinsic properties. For example, radar devices may generally be considered to have more accuracy than LiDAR devices. In such a situation, when a measurement difference is discovered between a radar and a LiDAR device, the measurement difference can be applied to the LiDAR device to compensate. As such, cross-sensor vehicle sensor calibration can be applied to compensate a poor calibration accuracy sensor on the basis of a good calibration accuracy sensor.

Some examples illustrating the use of cross-sensor vehicle sensor calibration will now be described with references to the foregoing. First, in a particular situation, all of the sensors 102 of the vehicle 100 may have previously been calibrated. For example, an EOL calibration may have been performed. The cross-sensor vehicle sensor calibration can then be performed to find possible calibration inaccuracy in any of the sensors 102. For example, this can indicate that the EOL calibration was done incorrectly, or else the vehicle 100 may have been subjected to forceful impact or other extreme circumstances that may have altered the installation of one or more of the sensors 102. That is, after at least one calibration procedure has previously been performed for each of the sensors 102, the measurement difference can be determined, and the action performed, to find a calibration inaccuracy of the calibration procedure. Again, if a measurement difference detected under such circumstances is relatively minor (e.g., below a threshold), it may be sufficient to apply compensation (e.g., by software algorithm) in response. Otherwise, online calibration or a visit to a service station may be done.

Second, some or all of the sensors 102 may currently not be calibrated. The cross-sensor vehicle sensor calibration can be performed to identify or determine at least one possible calibration parameter for any of the sensors 102. That is, for one of the sensors 102 a calibration procedure may not previously have been performed, and the measurement difference can be determined to obtain a calibration parameter for the one of the sensors 102. For example, if at least one of the sensors 102 is presently calibrated correctly, this sensor or sensors can be used as a reference in obtaining at least a better calibration value for any of the other sensors. The action performed based on determining the measurement difference can then include applying the determined calibration parameter(s) to the sensor(s).

Third, the calibration status of the sensors 102 may be unknown. This can happen when the system of the vehicle 100 lacks information about whether one or more of the sensors 102 is calibrated, or when the system knows that none of the sensors 102 is calibrated. That is, a calibration status for at least one of the sensors 102 may be unknown, and the measurement difference can be determined to decide whether the vehicle 100 should perform an online calibration, or whether the vehicle should be brought in for service. The use of cross-sensor vehicle sensor calibration can then eliminate the situation where the vehicle 100 merely triggers a flag indicating that some sensor is off. Rather, the vehicle 100 can generate a list of at least one sensor that appears to need calibration in view of the checking. As such, this can simplify the calibration work that will then be performed at a service station.

That is, in the present subject matter, the system of the vehicle 100 obtains the cross-sensor outputs (e.g., outputs 106A-106B and 108A-108B). A measurement difference regarding the position of the object can then be determined based on the outputs. An action can then be performed regarding at least one of the sensors 102 based on determining the measurement difference.

Figure 2:
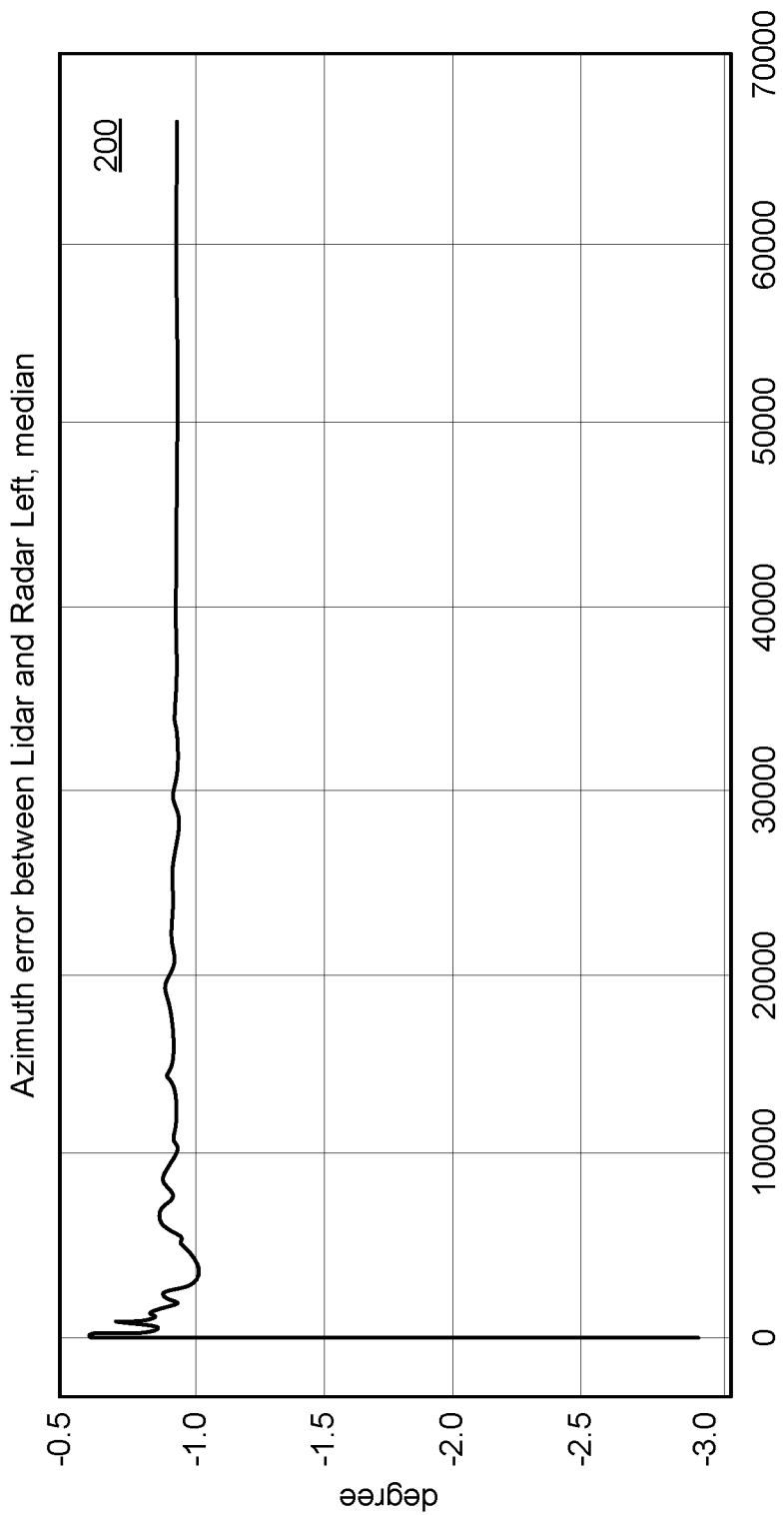
FIG. 2 shows an example of a graph of a statistic regarding a measurement difference relating to sensor outputs.

FIG. 2 shows an example of a graph 200 of a statistic regarding a measurement difference relating to sensor outputs. The described statistic(s) can represent one or more other examples described elsewhere herein. The graph 200 can represent any type of measurement. Here, the measurement is the median of the difference in azimuth detected by two separate sensors for an object, relative to the vehicle where the sensors are installed. As such, the azimuth difference is indicated against the vertical axis of the graph 200.

Each of the sensors can repeatedly generate respective outputs regarding the same object over a period of time. As such, multiple azimuth values for the object can be generated by one sensor, and corresponding azimuth values for the same object can be generated by another sensor. For each pair of these measurement values from the two sensors, a measurement difference value can be determined. For example, the azimuth difference 110A or 110B in FIG. 1 can be determined for each such pair of measurement values. For such determined measurement difference values, here the azimuth errors, a statistical measure can be determined. Any statistical measure that characterizes some aspect or characteristic of the entire data set can be used, including, but not limited to, a median or an average (e.g., the arithmetic mean). In the graph 200, the median of the azimuth errors is shown over the course of multiple tens of thousands of sensor measurements. During the earliest measurements (i.e., toward the left end of the horizontal axis) the median fluctuates somewhat, but at around 10,000 measurements (in the present example) the median value begins to converge. The azimuth difference here converges toward a value of about −1.0 degrees. This value of the azimuth difference median does not change significantly as the number of measurements exceeds 70,000 data points. As such, a convergence of the measurement difference values can be determined, wherein the action is performed in response to determining the convergence of the measurement difference values.

In some implementations, a recursive approach is applied in determining the measurement difference. For example, the recursive approach can be applied when a mean or a standard deviation is being calculated as a statistic for the measurement difference. This can avoid using significant memory space or other computer resources for storing large amounts of sensor data and corresponding calculated difference values. For example, if the many tens of thousands of data points shown in the graph 200 were persistently stored, this could require significant system resources in the vehicle. Rather, a recursive process can be used where only the current measurement difference value, and a previously calculated statistic, are stored. Assume that N previous data points have already been processed, and that a statistic $M_N$ represents the average of these N data points. The statistic $M_N$ is stored. When the next data point N+1 is obtained, the system updates the stored statistic with the current measurement difference value to obtain an updated statistic $M_{N+1}$ that represents the average of these N+1 data points. As such, only a previously calculated statistic, and a current measurement difference value, may be stored in memory, and the previously calculated statistic can be updated based on the current measurement difference value in each iteration of the recursive process.

Figure 3:
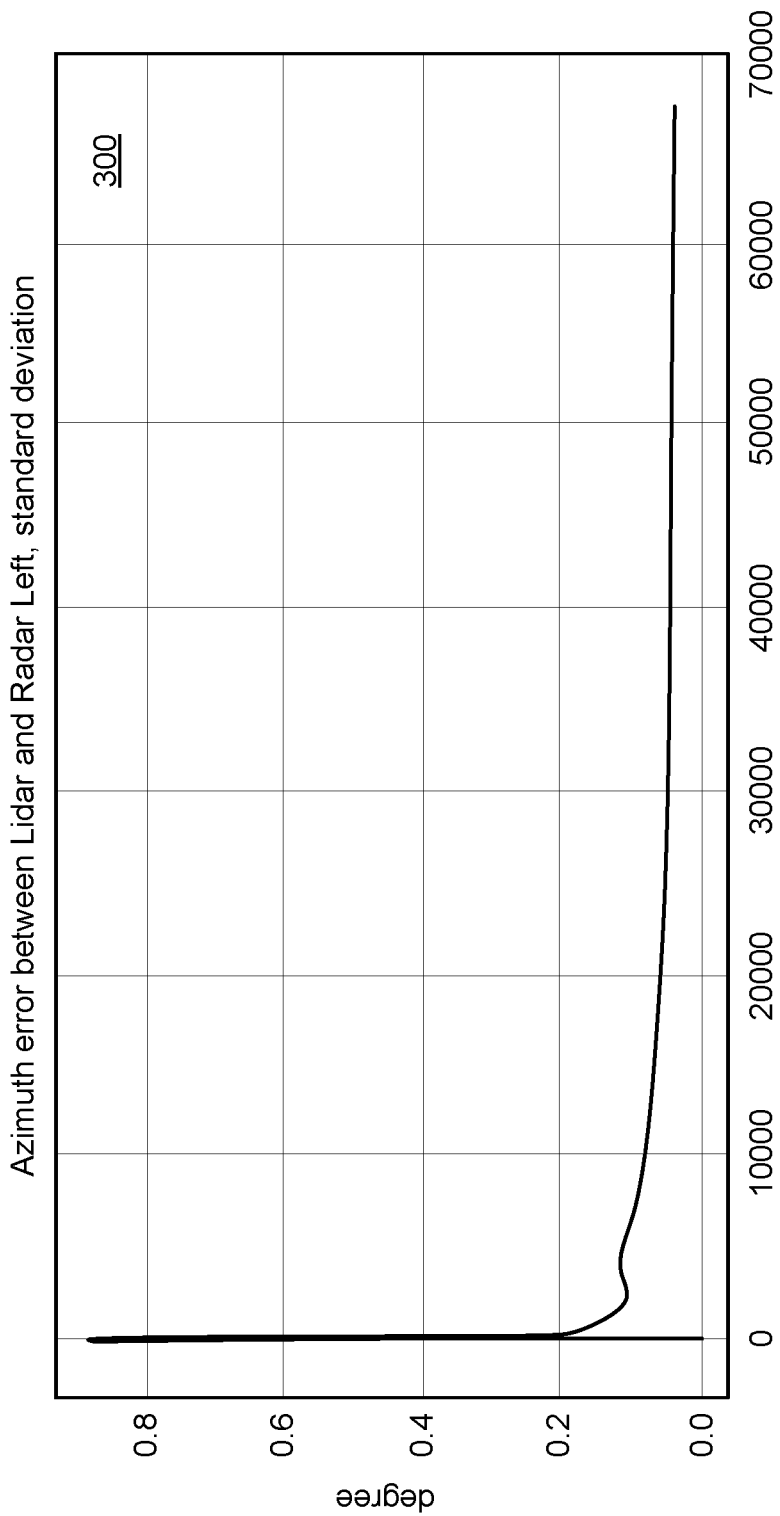
FIG. 3 shows an example of a graph that can indicate convergence of the statistic in the graph of FIG. 2.

FIG. 3 shows an example of a graph 300 that can indicate convergence of the statistic in the graph of FIG. 2. The graph 300 can represent one or more other examples described elsewhere herein. The graph 300 can represent any type of measurement. Here, the measurement is the standard deviation (std) of the difference in azimuth detected by two separate sensors for an object, relative to the vehicle where the sensors are installed. As such, the standard deviation of the azimuth difference is indicated against the vertical axis of the graph 300.

During the earliest measurements (i.e., toward the left end of the horizontal axis) the standard deviation fluctuates somewhat, but at around a few thousand measurements (in the present example) the standard deviation value begins to converge. The standard deviation here converges toward a value of less than about 0.1 degrees. This value of the azimuth difference standard deviation does not change significantly as the number of measurements exceeds 70,000 data points. In some implementations, determining the convergence of the measurement difference values can include determining a standard deviation of the measurement difference values. For example, the convergence of the measurement difference values can be determined in response to the standard deviation meeting a threshold value (e.g., less than about 0.1 degrees). That is, the threshold value can be used as a flag to see if convergence is occurring, because the convergence may not be immediately apparent from the stored measurement difference values if a recursive approach is used (e.g., only a previously calculated statistic and a current measurement difference value may be stored in memory). This flag can then indicate that the measurement difference values have converged.

Figure 4:
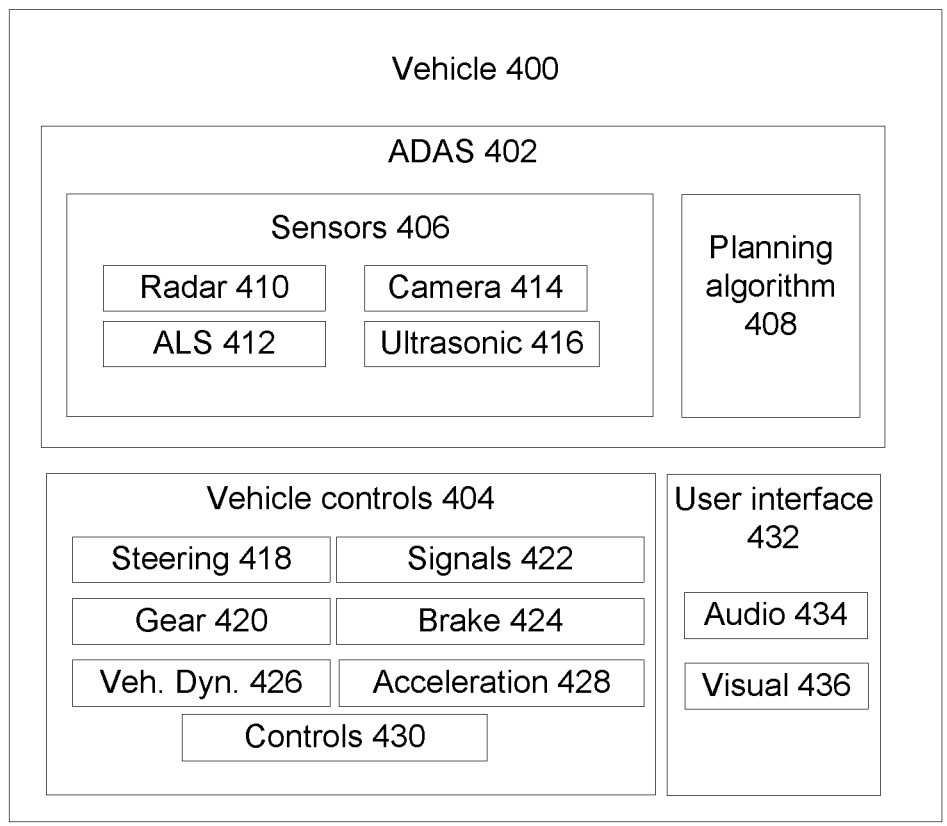
FIG. 4 shows an example of a vehicle.

FIG. 4 shows an example of a vehicle 400. The vehicle 400 can be used with one or more other examples described elsewhere herein. The vehicle 400 includes an ADAS 402 and vehicle controls 404. The ADAS 402 can be implemented using some or all components described with reference to FIG. 6 below. The ADAS 402 includes sensors 406 and a planning algorithm 408. Other aspects that the vehicle 400 may include, including, but not limited to, other components of the vehicle 400 where the ADAS 402 may be implemented, are omitted here for simplicity.

The sensors 406 are here described as also including appropriate circuitry and/or executable programming for processing sensor output and performing a detection based on the processing. The sensors 406 can include a radar 410. In some implementations, the radar 410 can include any object detection system that is based at least in part on radio waves. For example, the radar 410 can be oriented in a forward direction relative to the vehicle and can be used for detecting at least a distance to one or more other objects (e.g., another vehicle). The radar 410 can detect the surroundings of the vehicle 400 by sensing the presence of an object in relation to the vehicle 400.

The sensors 406 can include an active light sensor 412. In some implementations, the active light sensor 412 can include any object detection system that is based at least in part on laser light. For example, the active light sensor 412 can be oriented in any direction relative to the vehicle and can be used for detecting at least a distance to one or more other objects. The active light sensor 412 can detect the surroundings of the vehicle 400 by sensing the presence of an object in relation to the vehicle 400. The active light sensor 412 can be a scanning LiDAR or a non-scanning LiDAR (e.g., a flash LiDAR), to name just two examples.

The sensors 406 can include a camera 414. In some implementations, the camera 414 can include any image sensor whose signal(s) the vehicle 400 takes into account. For example, the camera 414 can be oriented in any direction relative to the vehicle and can be used for detecting vehicles, lanes, lane markings, curbs, and/or road signage. The camera 414 can detect the surroundings of the vehicle 400 by visually registering a circumstance in relation to the vehicle 400.

The sensors 406 can include an ultrasonic sensor 416. In some implementations, the ultrasonic sensor 416 can include any transmitter, receiver, and/or transceiver used in detecting at least the proximity of an object based on ultrasound. For example, the ultrasonic sensor 416 can be positioned at or near an outer surface of the vehicle. The ultrasonic sensor 416 can detect the surroundings of the vehicle 400 by sensing the presence of an object in relation to the vehicle 400.

Any of the sensors 406 alone, or two or more of the sensors 406 collectively, can detect, whether or not the ADAS 402 is controlling motion of the vehicle 400, the surroundings of the vehicle 400. In some implementations, at least one of the sensors 406 can generate an output that is taken into account in providing an alert or other prompt to a driver, and/or in controlling motion of the vehicle 400. For example, the output of two or more sensors (e.g., the outputs of the radar 410, the active light sensor 412, and the camera 414) can be combined. In some implementations, one or more other types of sensors can additionally or instead be included in the sensors 406.

The planning algorithm 408 can plan for the ADAS 402 to perform one or more actions, or to not perform any action, in response to monitoring of the surroundings of the vehicle 400 and/or an input by the driver. The output of one or more of the sensors 406 can be taken into account. In some implementations, the planning algorithm 408 can perform motion planning and/or plan a trajectory for the vehicle 400.

The vehicle controls 404 can include a steering control 418. In some implementations, the ADAS 402 and/or another driver of the vehicle 400 controls the trajectory of the vehicle 400 by adjusting a steering angle of at least one wheel by way of manipulating the steering control 418. The steering control 418 can be configured for controlling the steering angle though a mechanical connection between the steering control 418 and the adjustable wheel, or can be part of a steer-by-wire system.

The vehicle controls 404 can include a gear control 420. In some implementations, the ADAS 402 and/or another driver of the vehicle 400 uses the gear control 420 to choose from among multiple operating modes of a vehicle (e.g., a Drive mode, a Neutral mode, or a Park mode). For example, the gear control 420 can be used to control an automatic transmission in the vehicle 400.

The vehicle controls 404 can include signal controls 422. In some implementations, the signal controls 422 can control one or more signals that the vehicle 400 can generate. For example, the signal controls 422 can control headlights, a turn signal and/or a horn of the vehicle 400.

The vehicle controls 404 can include brake controls 424. In some implementations, the brake controls 424 can control one or more types of braking systems designed to slow down the vehicle, stop the vehicle, and/or maintain the vehicle at a standstill when stopped. For example, the brake controls 424 can be actuated by the ADAS 402. As another example, the brake controls 424 can be actuated by the driver using a brake pedal.

The vehicle controls 404 can include a vehicle dynamic system 426. In some implementations, the vehicle dynamic system 426 can control one or more functions of the vehicle 400 in addition to, or in the absence of, or in lieu of, the driver's control. For example, when the vehicle comes to a stop on a hill, the vehicle dynamic system 426 can hold the vehicle at standstill if the driver does not activate the brake control 424 (e.g., step on the brake pedal).

The vehicle controls 404 can include an acceleration control 428. In some implementations, the acceleration control 428 can control one or more types of propulsion motor of the vehicle. For example, the acceleration control 428 can control the electric motor(s) and/or the internal-combustion motor(s) of the vehicle 400.

The vehicle controls 404 can further include one or more additional controls, here collectively illustrated as controls 430. The controls 430 can provide for vehicle control of one or more functions or components. In some implementations, the controls 430 can regulate one or more sensors of the vehicle 400. For example, the vehicle 400 can adjust the settings (e.g., frame rates and/or resolutions) of the sensor(s) based on surrounding data measured by the sensor(s) and/or any other sensor of the vehicle 400.

The vehicle 400 can include a user interface 432. The user interface 432 can include an audio interface 434 that can be used for generating an alert regarding sensor calibration. In some implementations, the audio interface 434 can include one or more speakers positioned in the passenger compartment. For example, the audio interface 434 can at least in part operate together with an infotainment system in the vehicle.

The user interface 432 can include a visual interface 436 that can be used for generating an alert regarding sensor calibration. In some implementations, the visual interface 436 can include at least one display device in the passenger compartment of the vehicle 400. For example, the visual interface 436 can include a touchscreen device and/or an instrument cluster display.

Figure 5:
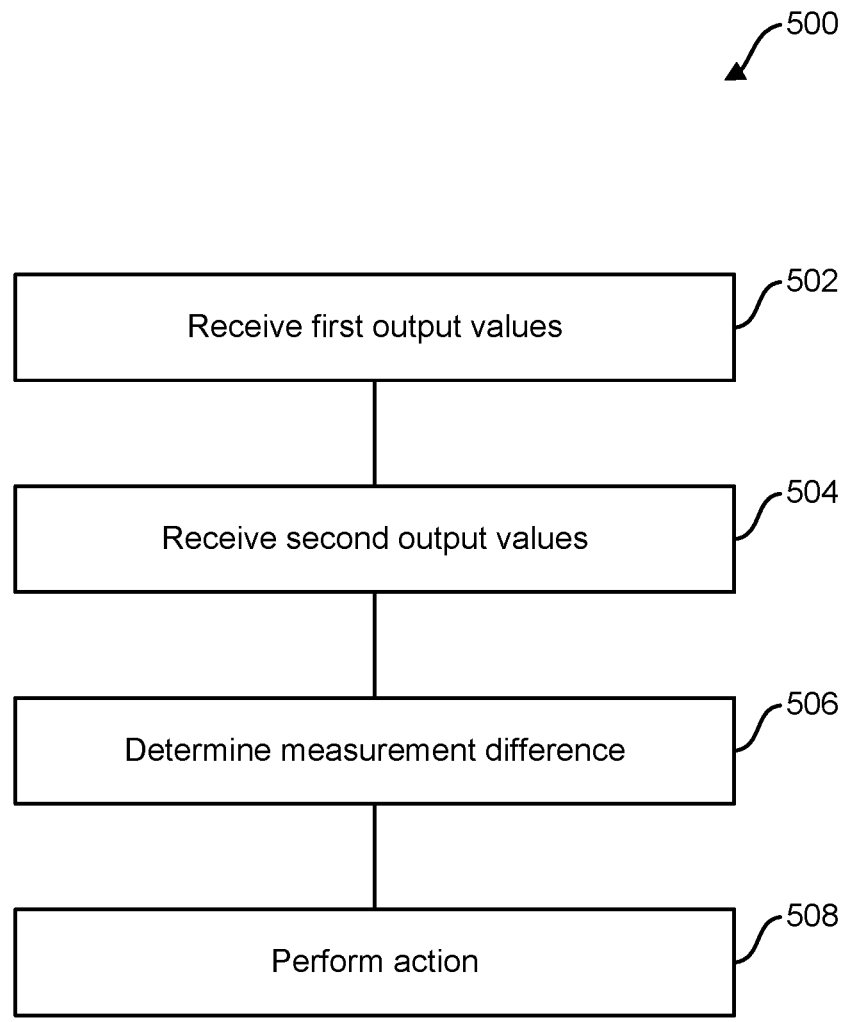
FIG. 5 shows an example of a method.

FIG. 5 shows an example of a method 500. The method 500 can be used with one or more other examples described elsewhere herein. More or fewer operations than shown can be performed. Two or more operations can be performed in a different order unless otherwise indicated.

At operation 502, first output values from a first sensor of a vehicle are received. The first output values reflect a position of an object external to the vehicle. For example, any of the outputs 106A or 108A in FIG. 1 can be received.

At operation 504, second output values from a second sensor of the vehicle are received. The second output values reflect a position of the object. For example, any of the outputs 106B or 108B in FIG. 1 can be received.

At operation 506, a measurement difference regarding the position of the object based on the first and second output values can be determined. For example, the azimuth difference 110A or 110B in FIG. 1 can be determined. As another example, the data of the graph 200 in FIG. 2 can be determined.

At operation 508, an action can be performed regarding at least one of the first or second sensors based on determining the measurement difference. For example, an online calibration can be performed. As another example, an ADAS can be adjusted to accommodate the measurement difference. As another example, the owner can be prompted to bring the vehicle to a service station for sensor calibration.

Figure 6:
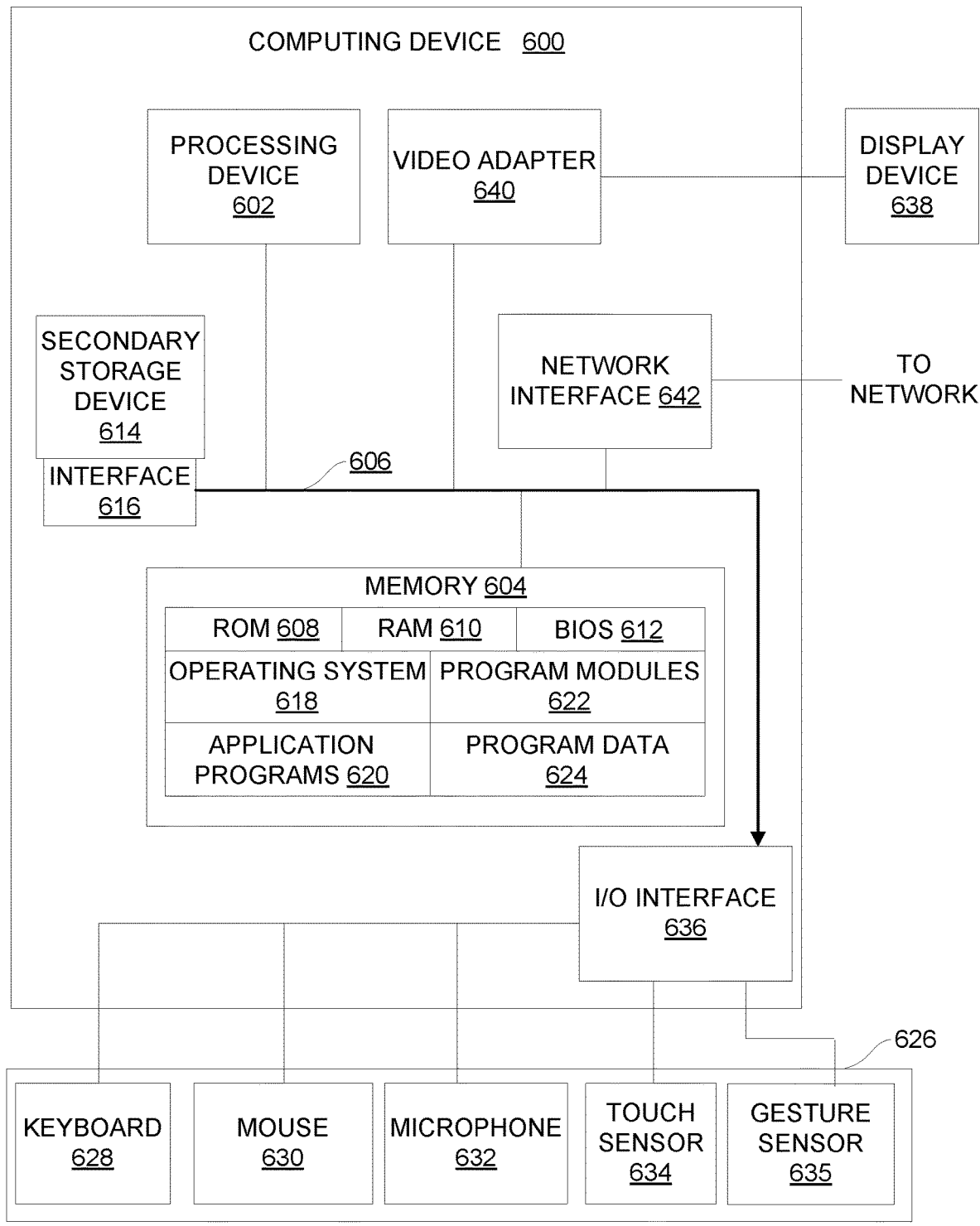
FIG. 6 illustrates an example architecture of a computing device that can be used to implement aspects of the present disclosure.

FIG. 6 illustrates an example architecture of a computing device 600 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 6 can be used to execute the operating system, application programs, and/or software modules (including the software engines) described herein.

The computing device 600 includes, in some embodiments, at least one processing device 602 (e.g., a processor), such as a central processing unit (CPU). A variety of processing devices are available from a variety of manufacturers, for example, Intel or Advanced Micro Devices. In this example, the computing device 600 also includes a system memory 604, and a system bus 606 that couples various system components including the system memory 604 to the processing device 602. The system bus 606 is one of any number of types of bus structures that can be used, including, but not limited to, a memory bus, or memory controller; a peripheral bus; and a local bus using any of a variety of bus architectures.

Examples of computing devices that can be implemented using the computing device 600 include a desktop computer, a laptop computer, a tablet computer, a mobile computing device (such as a smart phone, a touchpad mobile digital device, or other mobile devices), or other devices configured to process digital instructions.

The system memory 604 includes read only memory 608 and random access memory 610. A basic input/output system 612 containing the basic routines that act to transfer information within computing device 600, such as during start up, can be stored in the read only memory 608.

The computing device 600 also includes a secondary storage device 614 in some embodiments, such as a hard disk drive, for storing digital data. The secondary storage device 614 is connected to the system bus 606 by a secondary storage interface 616. The secondary storage device 614 and its associated computer readable media provide nonvolatile and non-transitory storage of computer readable instructions (including application programs and program modules), data structures, and other data for the computing device 600.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 614 and/or system memory 604, including an operating system 618, one or more application programs 620, other program modules 622 (such as the software engines described herein), and program data 624. The computing device 600 can utilize any suitable operating system.

In some embodiments, a user provides inputs to the computing device 600 through one or more input devices 626. Examples of input devices 626 include a keyboard 628, mouse 630, microphone 632 (e.g., for voice and/or other audio input), touch sensor 634 (such as a touchpad or touch sensitive display), and gesture sensor 635 (e.g., for gestural input). In some implementations, the input device(s) 626 provide detection based on presence, proximity, and/or motion. Other embodiments include other input devices 626. The input devices can be connected to the processing device 602 through an input/output interface 636 that is coupled to the system bus 606. These input devices 626 can be connected by any number of input/output interfaces, such as a parallel port, serial port, game port, or a universal serial bus. Wireless communication between input devices 626 and the input/output interface 636 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 638, such as a monitor, liquid crystal display device, light-emitting diode display device, projector, or touch sensitive display device, is also connected to the system bus 606 via an interface, such as a video adapter 640. In addition to the display device 638, the computing device 600 can include various other peripheral devices (not shown), such as speakers or a printer.

The computing device 600 can be connected to one or more networks through a network interface 642. The network interface 642 can provide for wired and/or wireless communication. In some implementations, the network interface 642 can include one or more antennas for transmitting and/or receiving wireless signals. When used in a local area networking environment or a wide area networking environment (such as the Internet), the network interface 642 can include an Ethernet interface. Other possible embodiments use other communication devices. For example, some embodiments of the computing device 600 include a modem for communicating across the network.

The computing device 600 can include at least some form of computer readable media. Computer readable media includes any available media that can be accessed by the computing device 600. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 600.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 600 can be characterized as an ADAS computer. For example, the computing device 600 can include one or more components sometimes used for processing tasks that occur in the field of artificial intelligence (AI). The computing device 600 then includes sufficient proceeding power and necessary support architecture for the demands of ADAS or AI in general. For example, the processing device 602 can include a multicore architecture. As another example, the computing device 600 can include one or more co-processors in addition to, or as part of, the processing device 602. In some implementations, at least one hardware accelerator can be coupled to the system bus 606. For example, a graphics processing unit can be used. In some implementations, the computing device 600 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
receiving first output values from a first sensor of a vehicle, the first output values reflecting a position of an object external to the vehicle;
receiving second output values from a second sensor of the vehicle, the second output values reflecting the position of the object;
determining a measurement difference regarding the position of the object based on the first and second output values, wherein a measurement difference value is determined for each pair of a first output value and a second output value so that multiple measurement difference values are determined, and wherein determining the measurement difference comprises performing a recursive process where a previously calculated statistic, and a current measurement difference value, are stored in memory, and wherein the previously calculated statistic is updated based on the current measurement difference value in each iteration of the recursive process; and
performing an action regarding at least one of the first or second sensors based on determining the measurement difference.

2. The method of claim 1, wherein the first and second outputs comprise azimuth values regarding the object relative to the vehicle, and wherein the measurement difference comprises an azimuth difference regarding the first and second sensors.

3. The method of claim 1, wherein at least one of the first and second sensors is a camera, a light ranging and detection device, or a radar.

4. The method of claim 1, further comprising determining a convergence of the measurement difference values, wherein the action is performed in response to determining the convergence of the measurement difference values.

5. The method of claim 1, wherein at least one calibration procedure was previously performed for each of the first and second sensors of the vehicle, and wherein the measurement difference is determined to find a calibration inaccuracy of the calibration procedure.

6. The method of claim 1, wherein for one of the first and second sensors of the vehicle a calibration procedure was not previously performed, and wherein the measurement difference is determined to obtain a calibration parameter for the one of the first and second sensors.

7. The method of claim 6, wherein performing the action comprises applying the obtained calibration parameter to the one of the first and second sensors.

8. The method of claim 1, wherein a calibration status for at least one of the first and second sensors of the vehicle is unknown, and wherein the measurement difference is determined to decide whether to (i) perform an online calibration of the vehicle or (ii) bring the vehicle in for service.

9. The method of claim 1, wherein the action comprises comparing the measurement difference with a threshold.

10. The method of claim 9, further comprising, in response to the measurement difference exceeding the threshold, performing a calibration of at least one of the first or second sensors.

11. A method comprising:
receiving first output values from a first sensor of a vehicle, the first output values reflecting a position of an object external to the vehicle;

receiving second output values from a second sensor of the vehicle, the second output values reflecting the position of the object;

determining a measurement difference regarding the position of the object based on the first and second output values, wherein a measurement difference value is determined for each pair of a first output value and a second output value so that multiple measurement difference values are determined;

determining a convergence of the measurement difference values, wherein determining the convergence of the measurement difference values comprises determining a standard deviation of the measurement difference values, wherein the convergence of the measurement difference values is determined in response to the standard deviation meeting a threshold value; and performing an action regarding at least one of the first or second sensors based on determining the measurement difference, wherein the action is performed in response to determining the convergence of the measurement difference values.

12. The method of claim 11, wherein determining the measurement difference comprises determining a median or average of the multiple measurement difference values.

13. The method of claim 11, wherein determining the measurement difference comprises performing a recursive process where a previously calculated statistic, and a current measurement difference value, are stored in memory, and wherein the previously calculated statistic is updated based on the current measurement difference value in each iteration of the recursive process.

14. A method comprising:

receiving first output values from a first sensor of a vehicle, the first output values reflecting a position of an object external to the vehicle;

receiving second output values from a second sensor of the vehicle, the second output values reflecting the position of the object;

determining a measurement difference regarding the position of the object based on the first and second output values;

performing an action regarding at least one of the first or second sensors based on determining the measurement difference, wherein the action comprises comparing the measurement difference with a threshold; and in response to the measurement difference not exceeding the threshold, compensating for the measurement difference in a control algorithm for the vehicle.

15. The method of claim 14, wherein a measurement difference value is determined for each pair of a first output value and a second output value so that multiple measurement difference values are determined.

16. The method of claim 15, further comprising determining a convergence of the measurement difference values, wherein the action is performed in response to determining the convergence of the measurement difference values.

17. The method of claim 16, wherein determining the convergence of the measurement difference values comprises determining a standard deviation of the measurement difference values, wherein the convergence of the measurement difference values is determined in response to the standard deviation meeting a threshold value.

18. The method of claim 14, further comprising, in response to the measurement difference exceeding the threshold, performing a calibration of at least one of the first or second sensors.

* * * * *